(12) United States Patent
Tashiro et al.

(10) Patent No.: US 7,032,283 B2
(45) Date of Patent: Apr. 25, 2006

(54) METHOD FOR ASSEMBLING A RADIATOR MODULE FOR AN AUTOMOBILE

(75) Inventors: Manabu Tashiro, Hiroshima-Ken (JP); Tomokatsu Ozawa, Hiroshima-Ken (JP); Tomomi Kajiya, Hiroshima-Ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 239 days.

(21) Appl. No.: 10/355,067

(22) Filed: Jan. 31, 2003

(65) Prior Publication Data

US 2003/0150094 A1 Aug. 14, 2003

(30) Foreign Application Priority Data

Feb. 14, 2002 (JP) .................................... 2002-036486

(51) Int. Cl.
*B23P 11/00* (2006.01)

(52) U.S. Cl. ......................... 29/428; 29/559; 29/33 K; 29/700; 269/909; 248/346.03

(58) Field of Classification Search ............... 29/281.1, 29/281.4, 559, 700, 33 K, 428; 269/909; 248/346.03
See application file for complete search history.

(56) References Cited

U.S. PATENT DOCUMENTS

| | | | | |
|---|---|---|---|---|
| 2,428,958 A | * | 10/1947 | Bohaboy et al. | ............... 408/97 |
| 3,149,825 A | * | 9/1964 | Watkins | ....................... 432/231 |
| 4,594,764 A | * | 6/1986 | Yamamoto | .................... 29/430 |
| 5,123,695 A | * | 6/1992 | Kanemitsu et al. | ..... 296/193.09 |
| 5,174,004 A | * | 12/1992 | King et al. | .................... 29/251 |
| 5,664,311 A | * | 9/1997 | Banks et al. | ............. 29/407.04 |
| 5,918,358 A | * | 7/1999 | Ffield et al. | ................... 29/559 |
| 6,170,141 B1 | * | 1/2001 | Rossway et al. | ........... 29/281.1 |
| 6,205,638 B1 | * | 3/2001 | Yustick | ......................... 29/464 |
| 6,282,769 B1 | * | 9/2001 | Longo et al. | ................... 29/417 |
| 6,292,999 B1 | * | 9/2001 | Rossway et al. | .............. 29/559 |
| 6,578,247 B1 | * | 6/2003 | Walker et al. | .............. 29/281.4 |
| 6,615,478 B1 | * | 9/2003 | Walker et al. | ................ 29/559 |
| 6,629,354 B1 | * | 10/2003 | Kline | .......................... 29/559 |
| 6,640,408 B1 | * | 11/2003 | Hedley et al. | ............. 29/281.1 |
| 6,682,061 B1 | * | 1/2004 | Steenwyk et al. | .......... 269/225 |
| 6,687,971 B1 | * | 2/2004 | Nakamura | .................... 29/430 |
| 6,769,171 B1 | * | 8/2004 | Jung | .......................... 29/700 |
| 6,785,944 B1 | * | 9/2004 | Herbkersman et al. | .... 29/281.1 |
| 2002/0043820 A1 | | 4/2002 | Brogly et al. | |
| 2003/0019090 A1 | * | 1/2003 | Matsumoto et al. | .......... 29/428 |

FOREIGN PATENT DOCUMENTS

| | | |
|---|---|---|
| EP | 0 477 702 A1 | 4/1992 |
| JP | 07-069244 A | 3/1995 |
| JP | 2001-030133 A | 2/2001 |

* cited by examiner

*Primary Examiner*—Essama Omgba
(74) *Attorney, Agent, or Firm*—Nixon Peabody LLP; Donald R. Studebaker

(57) ABSTRACT

A method for mounting a radiator module in the vicinity of the back side of a bumper reinforcement and assembling the radiator module to an automobile body while the bumper reinforcement is assembled to connect the front ends of the right and the left front side frames of the automobile body to each other. A jig base member is connected to an arm member of an outside conveyor, and the radiator module is positioned and held by a hand body a holding mechanism, the radiator module and the mounting jig are moved to a mounting position by the conveyor, and the jig base member is positioned to the bumper reinforcement by a positioning member. The bumper reinforcement is effectively utilized to position the jig base member. Then, the elevator, the hand body and the radiator module are moved downwardly to position a pair of right and left positioning members at right and left fender positions, respectively.

7 Claims, 12 Drawing Sheets

METHOD FOR ASSEMBLING A RADIATOR MODULE FOR AN AUTOMOBILE

BACKGROUND OF THE INVENTION

1. Field of the Invention

The present invention relates to a method for assembling a radiator module for an automobile and to an apparatus for assembling the same, and more particularly to a technique for assembling a radiator module containing a radiator and a radiator shroud where a bumper reinforcement is fixed.

2. Description of Prior Art

These days, it has been widely employed to assemble equipments and decorative for an automobile to an automobile body efficiently after modularizing them. For example, Japanese Patent Unexamined Publication (JP Kokai) 7-69244 discloses a method for assembling a front part of an automobile using connecting robot comprising the first step of setting a cooling parts module (radiator module) and an exterior module such as bumper to an assembling jig mounted on a bench, the second step of connecting both of the modules to each other by a connecting robot, the third step of mounting both of the modules to the automobile body by a mounting robot. It also discloses such an assembling jig.

On the other hand, Japanese Patent Unexamined Publication (JP Kokai) 2001-30133 discloses a work positioning apparatus, in which a radiator module such as the one just described is positioned and fixed to a work holding device, the work holding device is set in front of an automobile body, a positioning guide pin extending backward from the work holding device horizontally is inserted into positioning guide holes of the right and the left front side members of the automobile body, and the work holding device and the radiator module are conveyed backward to assemble a front end module to the automobile body.

Normally, front end part of an automobile body has a bumper reinforcement, which connects to the front ends of the right and the left front side frames each other. Before assembling the bumper reinforcement, there is a possibility for the positions of the right and the left front side frames and right and left fender parts of the automobile body to change slightly, and thus it is difficult to position a radiator with respect to these front side frames or right and left fender parts of the automobile body precisely to assemble it.

The work positioning technique described in the latter of above-identified publications employs a process where a radiator module is conveyed horizontally from the front of a automobile body to the back thereof and is assembled thereto. However, for the assembling technique, when the radiator module is conveyed horizontally from the front and is assembled to the automobile body, there is a possibility for the radiator module to interfere with the bumper reinforcement at the front end of the automobile body, or the height of the bumper reinforcement position imposes restriction on the process.

SUMMARY OF THE INVENTION

Accordingly, it is an object of the present invention to provide a method for assembling a radiator module efficiently with high precision while a bumper reinforcement is assembled to connect the front ends of the right and the left front side frames to each other, and to provide such an assembling apparatus.

The first embodiment of the present invention is a method for mounting a radiator module containing a radiator and a radiator shroud in the vicinity of the back side of a bumper reinforcement and assembling the radiator module to an automobile body while the bumper reinforcement is assembled to connect the front ends of the right and the left front side frames of the automobile body to each other, the method comprising the step of providing an assembling jig having a jig base member, an elevating body capable of being elevated with respect to the jig base member, a hand body connected to the elevating body, and a holding mechanism for holding the radiator module when positioning the radiator module on the hand body; the first step of connecting the jig base member to an arm member of an outside conveyor for carrying the assembly jig and the radiator module and holding the radiator module on the hand body by way of the holding mechanism; the second step of moving the assembling jig and the radiator module to a position for subsequent mounting to the automobile body; the third step of positioning the jig base member next to the bumper reinforcement by way of the positioning member; and the fourth step of moving the elevating body, the hand body and the radiator module downwardly from an upper position with respect to the jig base member and positioning a pair of the right and the left positioning members of the hand body to right and left fender parts of the automobile body, respectively.

In this connection, for example, an air balancer equipment can be used as the "conveyor" or "conveying means" just described. In this method, since the radiator module is assembled while a bumper reinforcement is assembled to connect the front ends of the right and the left front side frames to each other so that the structure of the front part of the automobile body is fixed, the radiator module is assembled efficiently with high precision.

In this method for assembling a radiator module, in the first step, the jig base member is connected to an arm member of an outside conveyor, and the radiator module is held on the hand body by way of the holding mechanism.

In the second step, the assembling jig and the radiator module are moved to a position for subsequent mounting to the automobile body. Then, in the third step, the jig base member is positioned to the bumper reinforcement by way of the positioning member. As a result, by using the bumper reinforcement effectively, the jig base member is positioned to the automobile body with high precision. Next, in the fourth step, the elevating body, the hand body and the radiator module are moved downwardly from the upper position with respect to the jig base member, and a pair of the right and the left positioning members of the hand body are positioned to right and left fender parts of the automobile body, respectively.

As described above, since a pair of the right and the left positioning members of the hand body are moved downwardly and positioned to right and left fender parts of the automobile body while the jig base member is positioned with respect to the bumper reinforcement, the hand body is positioned to the fender part efficiently with high precision. As a result, if the radiator module is held by the hand body with high precision, by positioning the hand body to the fender part precisely, the radiator module is positioned precisely with respect to the fender part of the front side frame.

The second embodiment of the present invention is, in the method for assembling a radiator module for an automobile of the first embodiment, the hand body of the assembling jig is connected to the elevating body rotatably around an axis that is positioned in a widthwise direction of the automobile body, and in the forth step, the hand body and the radiator module are moved downwardly to a predetermined non-interference down position with keeping their forward-inclining attitude, then the hand body and the radiator module are set to their normal attitude, and they are moved downwardly to a predetermined down end and a pair of the right and the left positioning members of the hand body are positioned to right and left fender parts of the automobile body, respectively.

When the jig base member is positioned to the bumper reinforcement, there is a possibility for the radiator module to interfere with the automobile body. In order to avoid this, the hand body and the radiator module are moved downwardly to a predetermined non-interference down position with keeping their forward-inclining attitude, then the hand body and the radiator module are set to their normal attitude, and they are moved downwardly to a predetermined down end and the right and the left positioning members of the hand body are positioned to right and left fender parts of the automobile body, respectively.

The third embodiment of the present invention is, in the method for assembling a radiator module for an automobile of the first embodiment, in the forth step, when the pair of the right and the left positioning members of the hand body are positioned to right and left fender parts of the automobile body, a positioning standard member of the hand body is positioned to the front side frame. As a result, due to the right and the left positioning members and a positioning standard member of the hand body, the hand body is positioned to the automobile body by the three different points, and thus is positioned to the automobile body with high precision.

The fourth embodiment of the present invention is, in the method for assembling a radiator module for an automobile of the first embodiment, the method comprising the fifth step of fixing a plurality of parts of the radiator module to be connected to the parts for connection of right and left fender parts of the automobile body and to the part for connection at the vicinity of the front side frame, respectively; and the sixth step of separating the hand body from the radiator module by releasing the holding mechanism. By positioning the hand body to the automobile body with high precision as just described, after the radiator module is positioned precisely to the automobile body by way of the hand body, in the fifth step, a plurality of parts of the radiator module to be connected are fixed to the parts for connection of right and left fender parts of the automobile body and to the part for connection at the vicinity of the front side frame, respectively. Then, in the sixth step, the hand body is separated from the radiator module by releasing the holding mechanism.

The fifth embodiment of the present invention is, in the method for assembling a radiator module for an automobile of the fourth embodiment, supporting strength for supporting the assembling jig and the radiator module by an arm member of the conveyor is reduced after the fourth step and before the fifth step. When an air balancer equipment is employed as the conveyor, the supporting strength for supporting the objects such as work by the arm member can be adjusted by a driving cylinder for balancing the load.

The supporting strength of the arm member of the conveyor is set to be equal to the sum of the weights of the assembling jig and the radiator module until the assembling jig and the radiator module are moved to the mounting position. Then, supporting strength for supporting the assembling jig and the radiator module by an arm member of the conveyor is reduced after the fourth step and before the fifth step, so that the status of the assembling jig and the radiator module positioned to the automobile body is stabilized, and the plurality of the parts of the radiator module to be connected can intimately contact with each of the parts for connection easily.

The sixth embodiment of the present invention is, in the method for assembling a radiator module for an automobile of the fourth embodiment, in the sixth step, the supporting strength for supporting the assembling jig by an arm member of the conveyor is reduced by the weight of the radiator module at the time of the release of the holding mechanism. When an air balancer equipment is employed as the conveyor, if the supporting strength of the arm member is not adjusted, and the weight of the radiator module suddenly stop acting on the arm member due to the release of the holding mechanism, the arm member can abruptly jump. Such abrupt jump of the arm member can be avoided by reducing the supporting strength for supporting the assembling jig by an arm member by the weight of the radiator module.

The seventh embodiment of the present invention is, in the method for assembling a radiator module for an automobile of the first embodiment, the radiator module contains a condenser for an air conditioner in addition to the radiator. A condenser for an air conditioner can be assembled together with a radiator as a module.

The eighth embodiment of the present invention is an apparatus for assembling a radiator module to the front end of an automobile body, the apparatus comprising a conveying means for carrying the assembly jig and the radiator module, the conveying means having an arm member; a jig base member which is connectable to the arm member; an elevating body which can be elevated on the jig base member by way of a guide rod, and driving means for elevating the elevating body; a hand body which is rotatable around an axis that is positioned in a widthwise direction of the automobile body on the elevating body, and driving means for rotating the hand body; a first positioning member which is provided on the hand body and is engagable to and disengagable from a positioning hole at the top end of the radiator module from above; a second positioning member which is provided on the hand body and is engagable to and disengagable from a positioning hole at the front end of the radiator module from front, and driving means for driving the second positioning member to engage and disengage the positioning hole; a third positioning member which is provided on the jig base member and is engagable to and disengagable from a positioning hole of a bumper reinforcement from above; and a fourth positioning member which is provided on the hand body and is engagable to and disengagable from a standard hole of a fender part from above, and a frame standard member which is engagable to and disengagable from a standard hole of a front side frame.

In order to assemble the radiator module, the jig base member is connected to the arm member of the outside conveying means, and the jig base member is moved to the radiator module so that the radiator module is held by the hand body. In this connection, the radiator module is held by engaging the first positioning member on the hand body to the positioning hole at the top end of the radiator module from above, and engaging the second positioning member on the hand body to the positioning hole at the front end of the radiator module.

Then, the radiator module supported by the jig base member by way of the elevating body and the hand body is moved to the mounting position at the front end of the automobile body by the arm member of the conveying means. Next, the hand body and the radiator module is elevated by the driving means for elevation by way of the elevating body, or according to the necessity, the hand body and the radiator module is inclined to forward by the driving means for rotation. Then the jig base member is moved downwardly by the arm member toward the bumper reinforcement, and the third positioning member on the jig base member and is engaged to the positioning hole of a bumper reinforcement from above.

Next, the hand body and the radiator module are moved downwardly to a predetermined down position by the driving means for elevation with keeping their forward-inclining attitude. Then the hand body and the radiator module are set to their normal attitude, they are moved downwardly to a predetermined down end, and the fourth positioning member on the hand body and is engaged to the standard hole of a front side frame from above. Thus, since the hand body is positioned precisely to the automobile body, the radiator module which has been positioned to the hand body by way of the first and the second positioning members will be positioned to the automobile body with high precision.

DESCRIPTION OF THE PREFERRED EMBODIMENT

Figure 1:
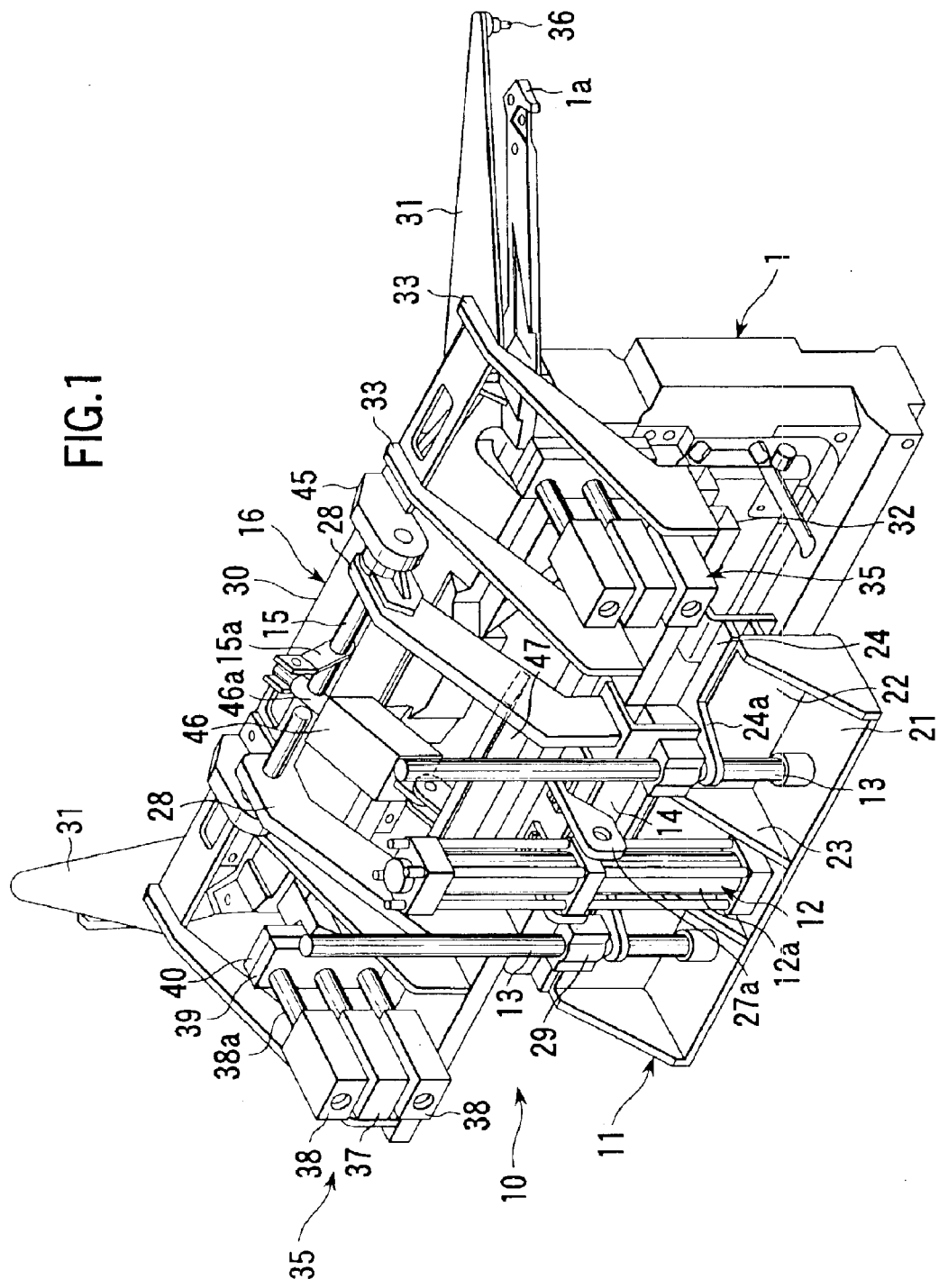
FIG. 1 is a perspective view of the assembling jig and the radiator module according to an embodiment of the present invention.
Figure 2:
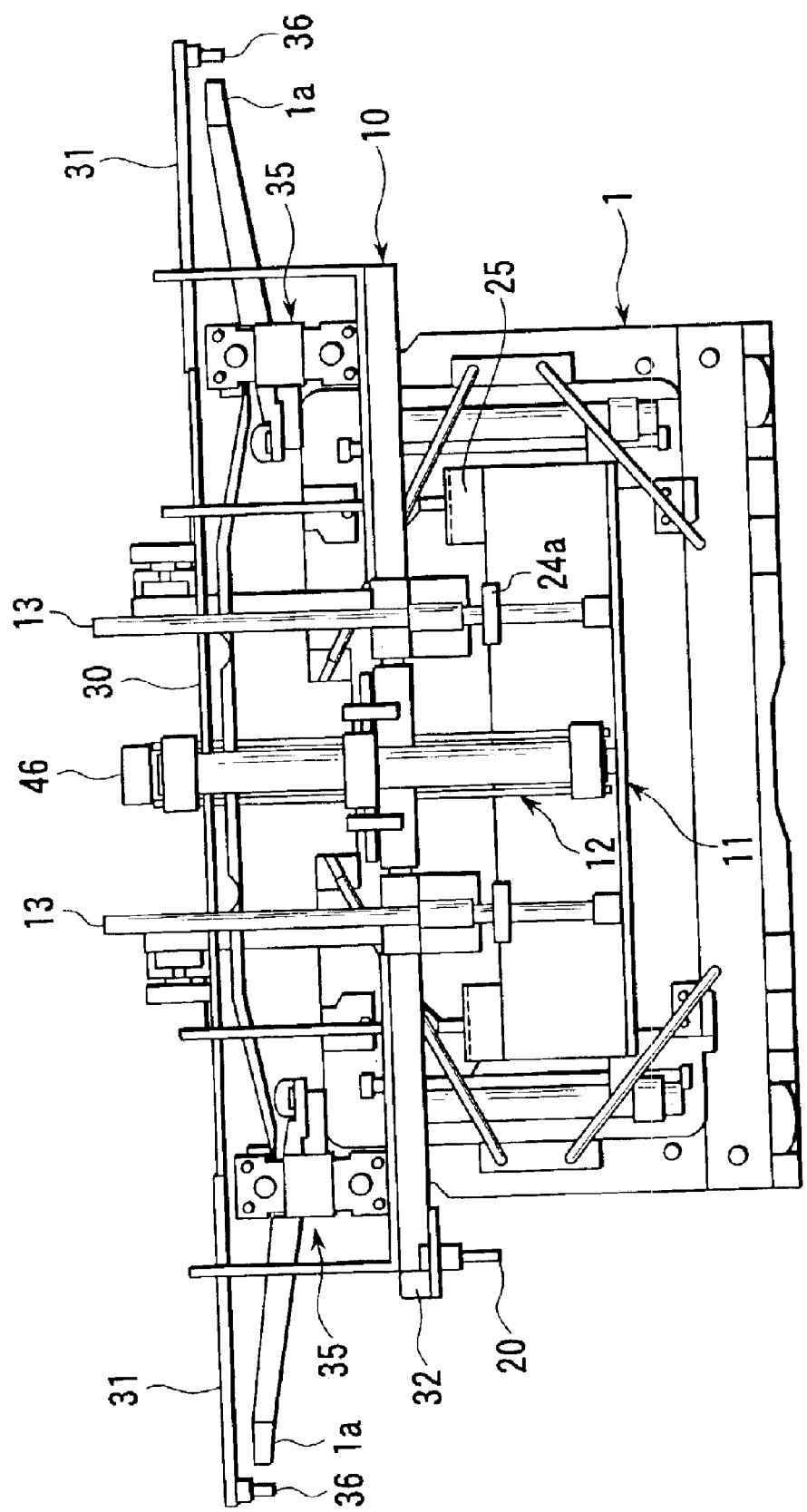
FIG. 2 is a front view of the assembling jig and the radiator module.
Figure 3:
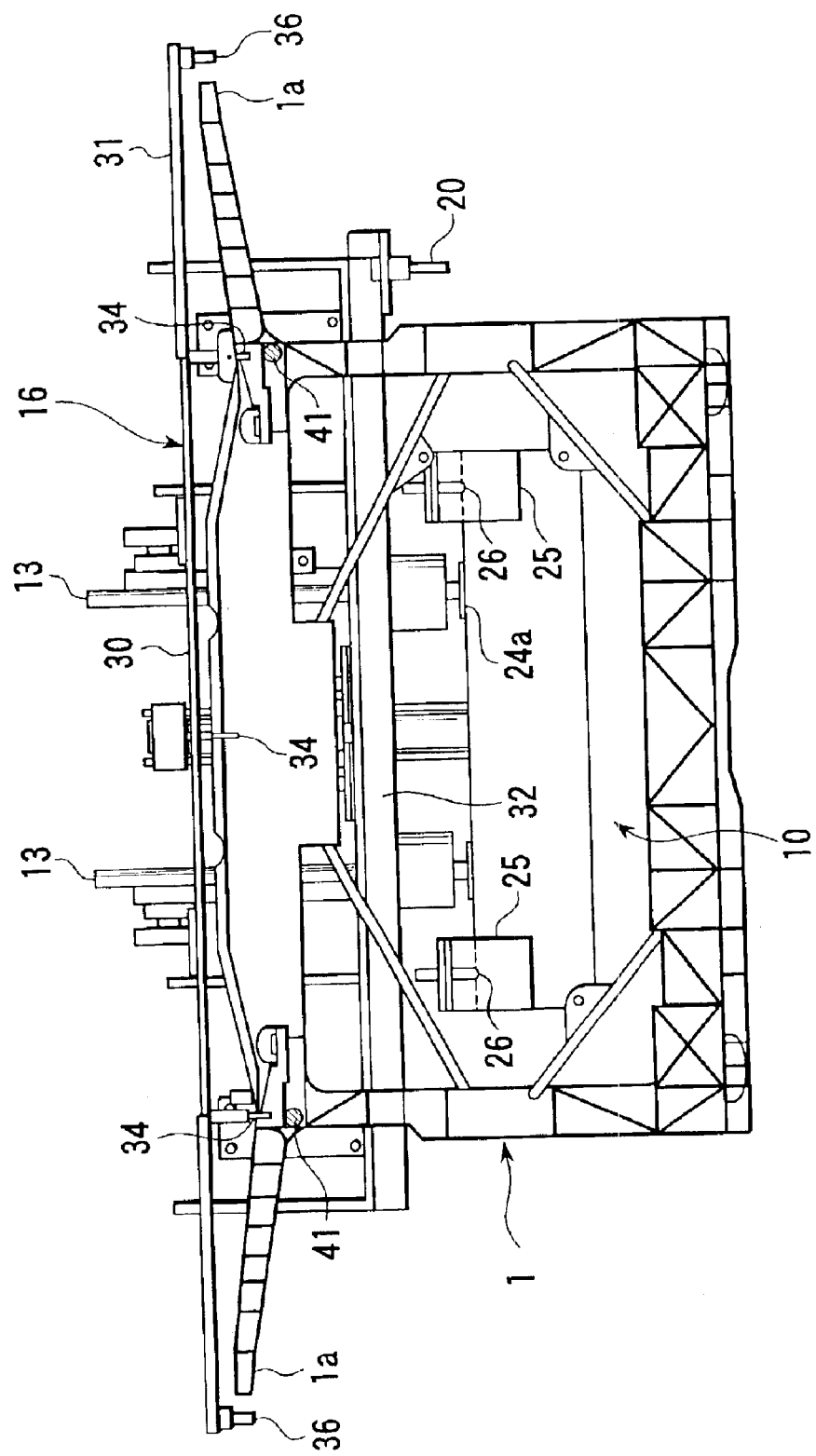
FIG. 3 is a back view of the assembling jig and the radiator module.

Embodiments of the present invention will be explained hereinafter by referring to the drawings.

Figure 6:
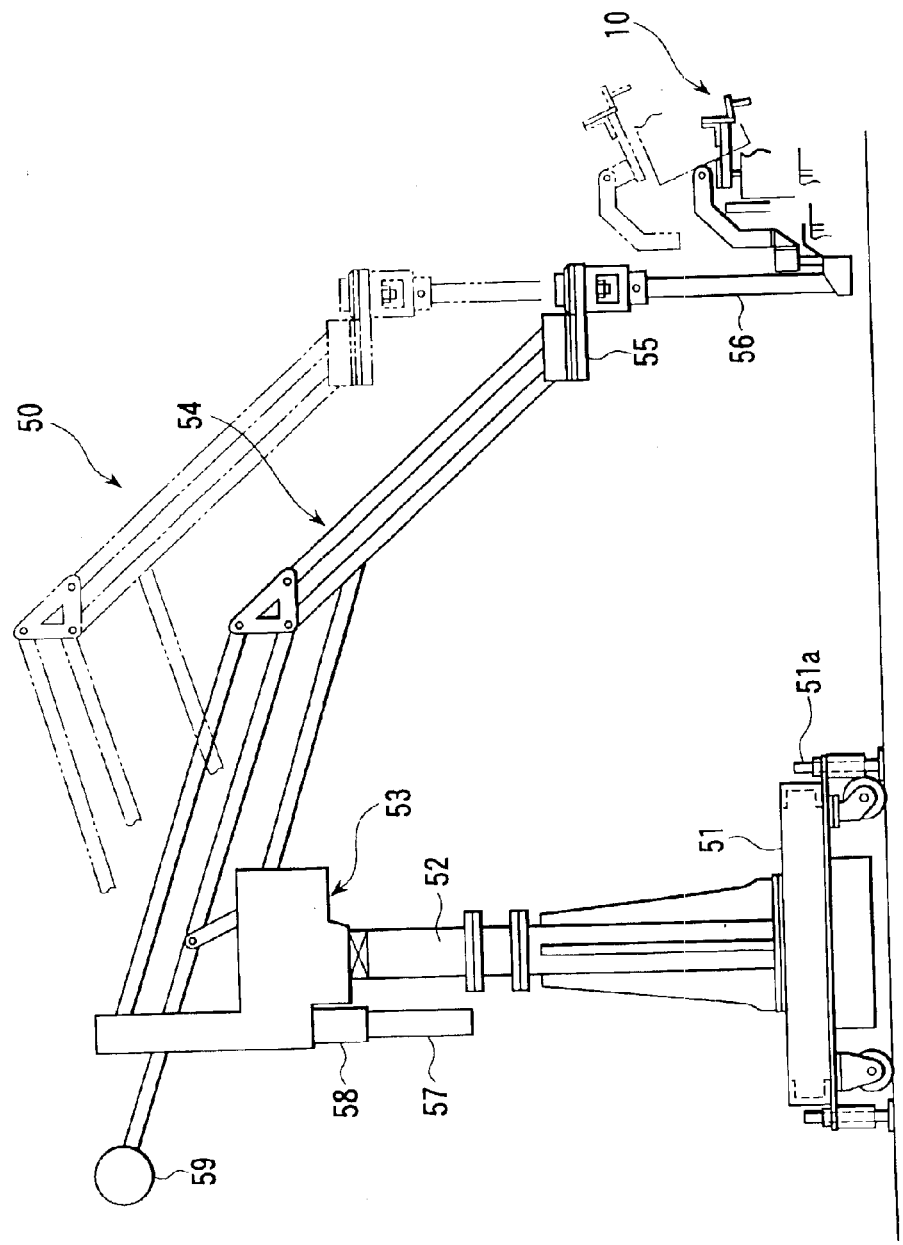
FIG. 6 is a side view of the air balancer equipment.
Figure 7:
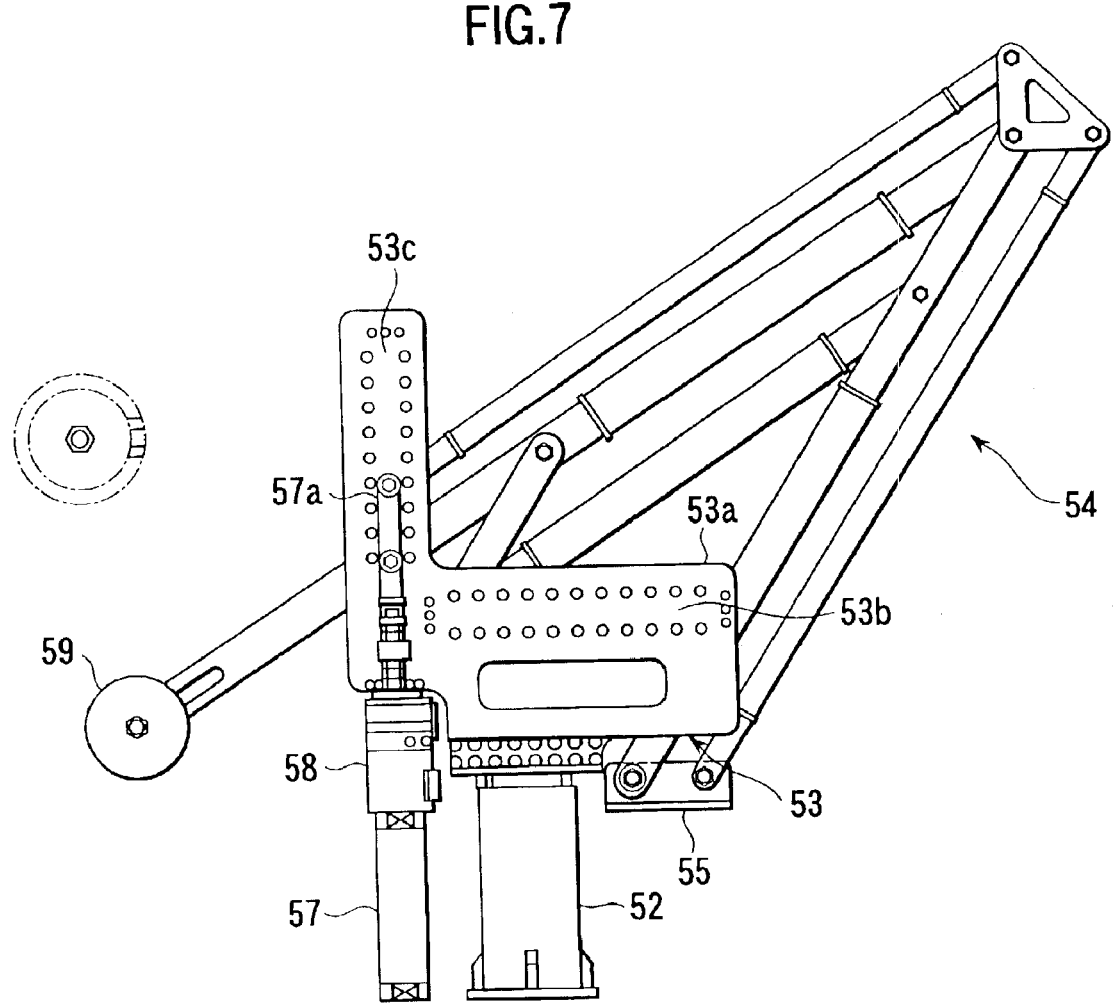
FIG. 7 is a side view of the essential part of the air balancer equipment.
Figure 8:
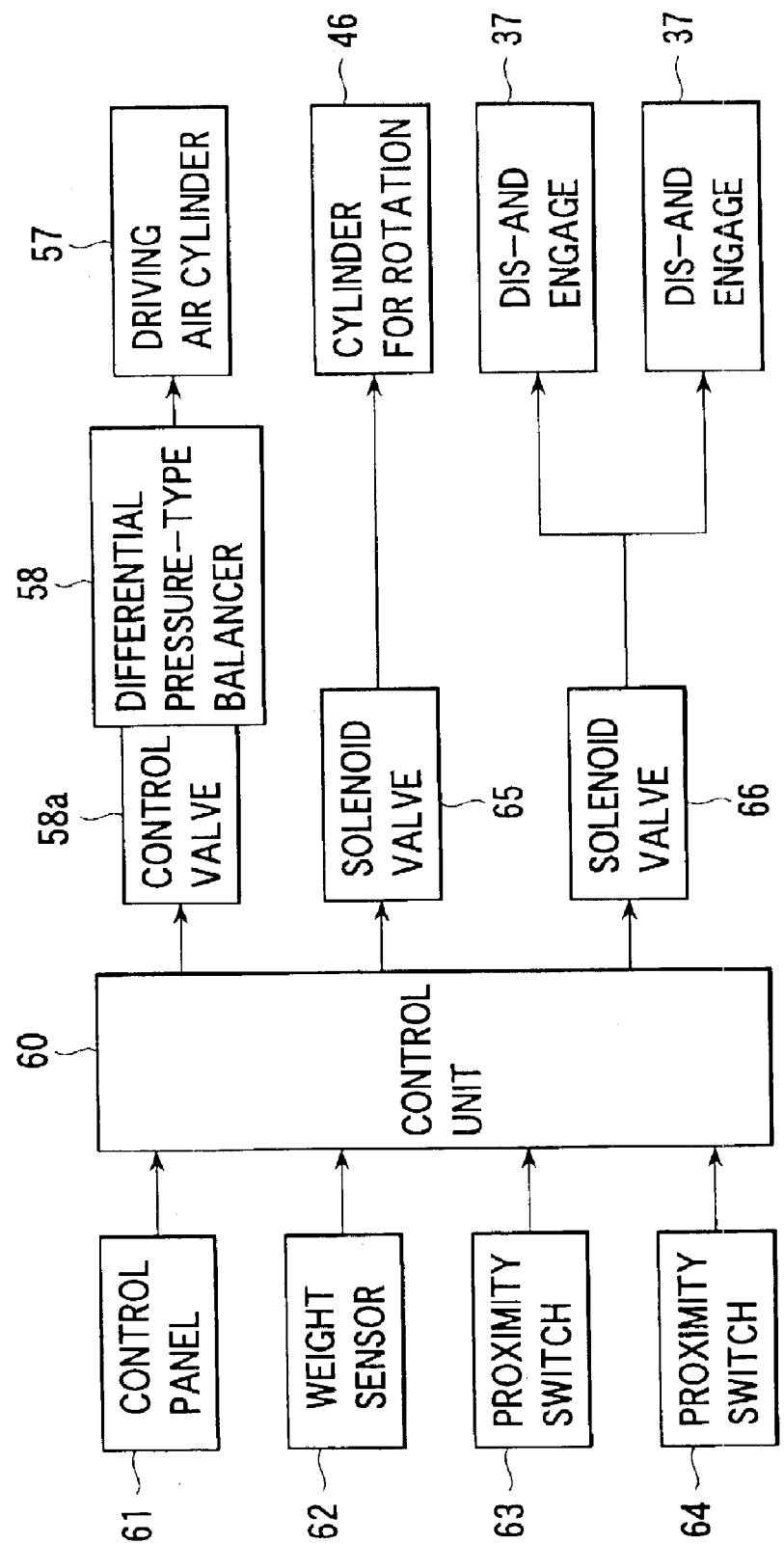
FIG. 8 is a block diagram of the control system for air balancer equipment and the assembling jig.

FIGS. 1 to 5 are diagrams showing the situation where the radiator module is assembled to the radiator module assembling apparatus, FIGS. 6 to 8 are diagrams showing the air balancer equipment for the conveyor, FIGS. 9 to 13 are diagrams showing the situation where the radiator module assembling apparatus and the radiator module are supported by the air balancer equipment, and thus the radiator module is assembled to the front end part of the automobile body. In this connection, in the following explanation, the directions of frond, back, right and left denote corresponding directions with respect to the automobile body (see FIGS. 9 to 13).

Radiator module 1 is a module assembled from a radiator for an automobile, a condenser for an air conditioner and a radiator shroud, although the description for the radiator itself is omitted in the radiator module 1 shown in the drawing. This radiator module 1 is assembled in the vicinity of the back side of bumper reinforcement 3, in the situation where the bumper reinforcement 3 has been assembled to the front end of the automobile to connect the front ends of the right and the left front side frames 2 to each other.

Radiator Module Assembling Apparatus: (see FIGS. 1 to 5)

First, referring to FIGS. 1 to 5, the radiator module apparatus 10 will be explained. This radiator module assembling apparatus 10 (hereinafter called "assembling jig") has, as major members, such as jig base member 11, cylinder for elevation (driving means for elevation) 12, a pair of guide rods 13, elevating body 14, and hand body 16 supported by horizontal spindle 15 directed to the car width direction.

Jig base member 11 is bolted to hanging member 56 connected to arm member 54 of outside air balancer equipment 50 described afterward, and assembling jig 10 and radiator module 1 set thereto are supported by air balancer equipment 50 and conveyed. Jig base member 11 has bottom plate 21, right and left side plates, back plate 22, a pair of bracket 23 at both sides of cylinder for elevation 12. Crosspiece 24 having square U-shaped cross-section is fixed at the top of back plate 22, and a pair of guide rods 13 are inserted into the guide holes of a pair of guide pieces 24a formed such that they project to forward from crosspiece 24, thus the vicinity of the bottom end of guide rod 13 is supported.

Figure 4:
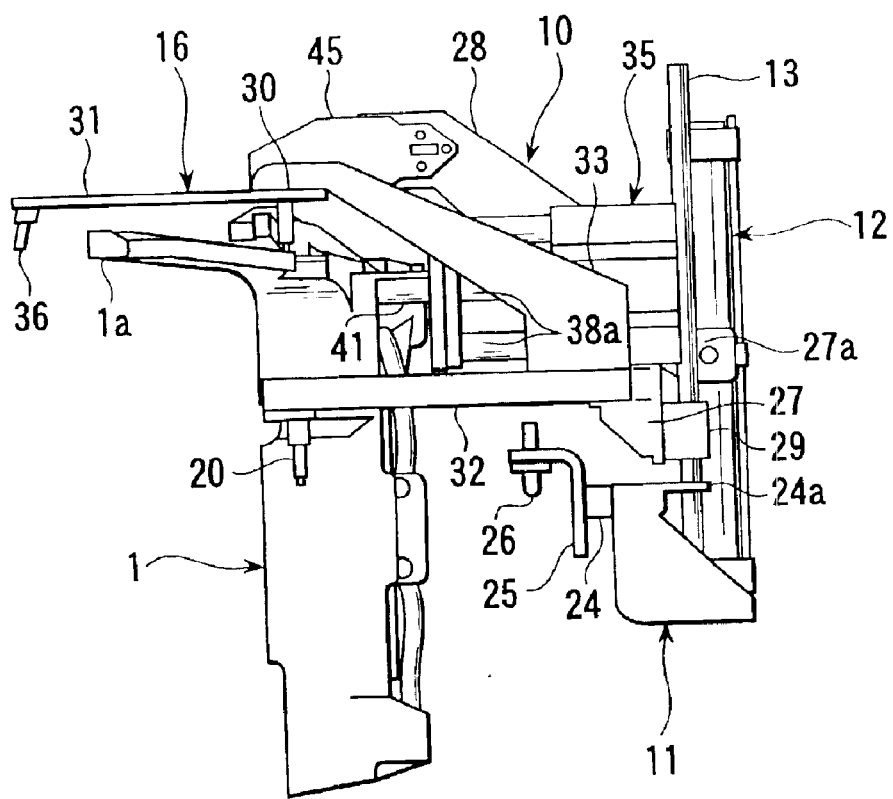
FIG. 4 is a right side view of the assembling jig and the radiator module.
Figure 5:
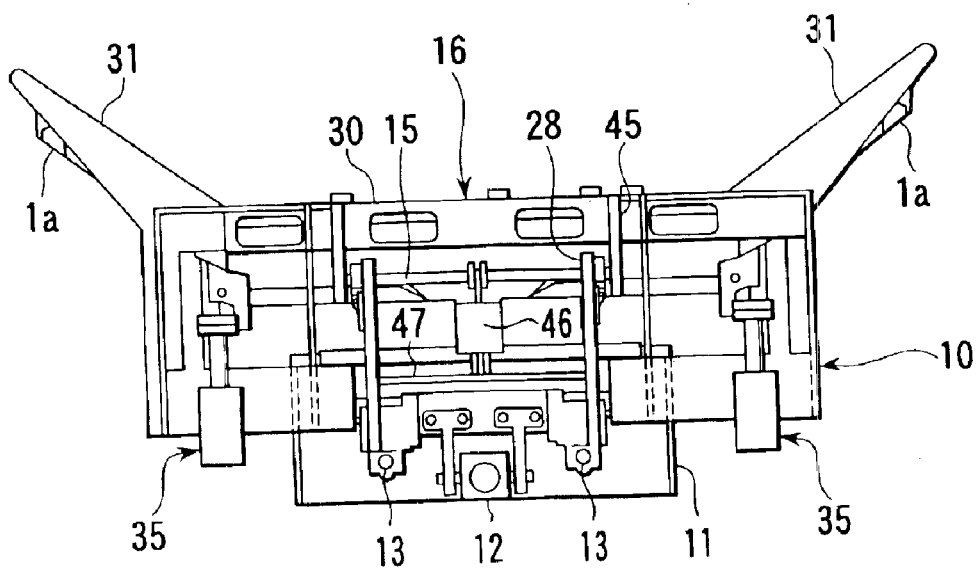
FIG. 5 is a plane view of the assembling jig and the radiator module.

Referring FIG. 4, a pair of right and left pin supporting plates 25 having L-shaped cross-section are fixed to crosspiece 24, and to the pair of pin supporting plates 25, positioning pins (third positioning member) 26, which are engagable to and disengagable from a pair of right and left positioning hole (not shown) of bumper reinforcement 3 of the automobile from above, are fixed, respectively. The bottom ends of the pair of guide rods 13 are welded to bottom plate 21 by way of cylinder body and supported by the pair of guide pieces 24a. In addition, although not shown, the top ends of the pair of guide rods 13 are connected to hanging member 56.

Cylinder for elevation 12 consisting of an air cylinder is disposed vertically with upside down to the center of bottom plate 21 of jig base member 11, and a piston rod extending downward from cylinder body 12a is connected to the top surface of bottom plate 21.

Elevating body 14 has horizontal member 27, a pair of arm members 28 extending obliquely up behind from horizontal member 27, and a pair of the parts to be guided 29 which are provided in the vicinity of the lower end of the pair of arm members 28 and externally engaged to the pair of guide rods 13 slidably. Horizontal member 27 of elevating body 14 is connected to the midsection of cylinder body 12a of cylinder for elevation 12 by way of a pair of connecting members 27a, and elevating body 14 goes up when the rod of cylinder for elevation 12 is extended and it goes down when the rod is pulled back.

Hand body 16 serves for assembling radiator module 1 by holding the module, and it is connected rotatably around spindle 15 directed to the car with direction to the top end of a pair of arm members 28 of elevating body 14.

Hand body 16 has such as holding plate 30 corresponding to the top end of radiator module 1, a pair of right and left projecting parts 31 extending obliquely and horizontally behind from both of the right and the left ends of holding plate 30, shelf member 32 which extends right and left at front and below of holding plate 30 and is fixed to holding plate 30 by four connecting members 33, positioning pin (first positioning member) 34 which projects from the bottom surface of holding plate 30 and is engagable to and disengagable from three positioning holes at the top end of radiator module 1 from above, a pair of positioning pin mechanisms 35 provided at both right and left ends of shelf member 32, a pair of positioning pins (fourth positioning member) 36 which project from the back ends of a pair of right and left projecting parts 31 and is engagable to and disengagable from a pair of positioning standard holes of a fender part 4 from above, and frame standard pin (frame standard member) 20 which projects from the bottom surface of the right end side of shelf member 32.

Each of positioning pin mechanisms 35 has such as a pair of upper and lower guide blocks 38 and cylinder for engage and disengage (driving means for engage and disengage) 37 disposed and fixed on shelf plate 32, pin holding plates 39, 40 which are capable of facing to the front face of both ends of radiator module 1 and are connected to the tip of the piston rod of cylinder for engage and disengage 37, positioning pin (second positioning member) 41 which project backward from the back side of pin holding plates 39, 40 and is engagable to and disengagable from a positioning hole at the front end of radiator module 1, and a pair of guide rods 38a which are fixed to the top and the bottom of pin holding plates 39, 40 and are inserted respectively into a pair of guide blocks 38. In each of positioning pin mechanisms 35, the cylinder body of cylinder for engage and disengage 37 and the pair of guide blocks 38 are fixed to shelf member 32.

When radiator module 1 is positioned to and held by hand body 16, hand body 16 is moved downwardly from the upper position with respect to radiator module 1, three positioning pins 34 at the lower part of holding plate 30 are engaged to three positioning holes at the top end of the radiator module 1 from above respectively, then a pair of pin holding plates 39, 40 are moved backward by cylinder for engage and disengage 37 of the pair of positioning pin mechanisms 35, thus the pair of positioning pins 41 are horizontally engaged to a pair of positioning holes at the front end of the radiator module 1 from front. In this connection, those such as above-described holding plate 30, three positioning pins 34 and a pair of positioning pin mechanisms 35 correspond to the holding mechanism for holding radiator module 1 with positioning it to hand body 16.

Explanation will be made for the structure for rotating hand body 16 by connecting it to elevating body 14 rotatably. A pair of right and left connecting pieces 45 are fixed to holding plate 30 of hand body 16 in the vicinity of outside of a pair of arm members 28 so that they project backward, spindle 15 is inserted through the back end of the pair of arm members 28 and the front end of the pair of connecting pieces 45, and both ends of the spindle 15 are fixed to the pair of connecting pieces 45. By rotating the spindle 15, cylinder for rotation 46 (which consists of an air cylinder) as driving means for rotating hand body 16 is obliquely disposed between holding plate 30 and cylinder for elevation 12.

The end of the cylinder body of cylinder for rotation 46 is rotatably connected to supporting member 47 hooked to a pair of arm member 28 by way of the projecting piece at the side of the end and a pin member and a pair of projecting pieces at the side of supporting member 47. The tip of piston rod 46a of cylinder for rotation 46 is connected by pin to arm member 15a projecting from spindle 15. In the situation where hand body 16 is held in almost horizontal attitude as shown in FIG. 1, piston rod 46a of cylinder for rotation 46 is extended, and radiator module 1 held by hand body 16 has almost vertical normal attitude (attitude for being assembled to the automobile body). When piston rod 46a of cylinder for rotation 46 is pulled back, spindle 15 rotates so that hand body 16 has forward-inclining attitude, and that radiator module 1 held by hand body 16 has forward-inclining attitude.

As described above, a pair of positioning pins (fourth positioning member) project from the bottom surface of the back ends of a pair of projecting parts 31, and frame standard pin (frame standard member) 20, which is engagable to and disengagable from a positioning standard hole of front side frame 2 in the right side of the automobile body from above, projects downward from the bottom surface of the right end side of shelf member 32. As a result, by engaging a pair of right and left positioning pins 36 of hand body 16 to the positioning standard holes of right and left fender part 4 from above, and by engaging positioning pin 20 of shelf member 32 to the positioning standard hole of front side frame 2 in the right side from above, hand body 16 and radiator module 1 positioned to and held by the hand body 16 will be efficiently positioned to the automobile body with high precision.

Air Balancer Equipment: (See FIGS. 6 to 8)

Next, explanation for air balancer equipment 50 will be made. Air balancer equipment 50 is an equipment for conveying assembling jig 10 which holds radiator module 1 to a mounting position at an automobile body and for holding assembling jig 10 and radiator module 1 while they are assembled. Air balancer equipment 50 is an air balance equipment having an ordinal structure, and corresponds to the conveyor.

As shown in FIG. 6, air balancer equipment 50 has such as base body 51 as a base, column body 52 standing on the base body 51, arm supporting member 53 connected and fixed to the top of the column body 52, arm member 54 which contains two pairs of parallel link mechanisms connected to the arm supporting member 53, connecting head member 55 at the tip of the arm member 54, and hanging member 56 which is connected to the connecting head member 55 and is extended to be bolted to jig base member 11 of assembling jig 10. Provided at the vicinity of each of the four corners of base body 51 is outrigger 51a, and arm supporting member 53 is rotatable horizontally in 180 degrees with respect to column body 52.

Referring FIGS. 9 to 13, hanging member 56 just described has nearly gate-shape, the center of the beam part at the upper end is bolted to connecting head member 55, and the lower ends of a pair of gate-shape legs are bolted to a pair of bracket 23 in jig base member 11 of assembling jig 10. In this connection, assembling jig 10 is only schematically shown in FIG. 6.

As shown in FIG. 7, provided at arm supporting member 53 of air balancer equipment 50 are body board 53a, air cylinder for drive 57 standing upside down, and air pressure differential-type balancer 58 which controls supporting strength (the strength for supporting an object) for supporting at the tip of arm member 54 by controlling the air pressure of air cylinder for drive 57 through control valve 58a. Fulcrum connecting member 53b for connecting the fulcrum of arm member 54 so that the position of the fulcrum is selected is provided at the lower part of body board 53a. Base terminal fulcrum guide part 53c for guiding the base terminal fulcrum of arm member 54 to be connected to piston rod 57a of air cylinder for drive 57 is provided at the upper part of body board 53, so that the base terminal fulcrum is guided by changing its position up and down. Balance weight 59 is provided at the base terminal of main arm 54a of arm member 54.

Basically, the air balancer equipment 50 controls the air pressure of cylinder for drive 57 by air pressure differential-type balancer 58 in response to the angle or the attitude of arm member 54 which changes according to the position of the object hung such as work. It also controls the amount of extension of piston rod 57a of air cylinder for drive 57. Thus, it can support the whole weight of the object hung at the tip of arm member 54, and control the supporting strength for hanging the object at the tip of arm member 54 according to the command from control panel 61 described afterward.

Next, explanation will be made for a control system for the apparatus for assembling radiator module 10 which contains a control system for the air balancer equipment 50. In this connection, a plurality of air hoses to cylinders 12, 37, 46 of assembling jig 10 and plurality of leads to proximity switches (described afterward) 63, 64 provided on assembling jig 10 are disposed along arm member 54 of air balancer equipment 50. The plurality of air hoses are connected to an air supply source, and the plurality of leads are connected to control unit (described afterward) 60. As shown in FIG. 8, control unit 60 having microcomputer, I/O and plurality of driving circuits is provided. To the control unit 60, control panel 61, weight sensor 62 which can detect the weight of the object hung, and control valve 58a of differential pressure-type balancer 58 are connected. In addition, to control unit 60, proximity switches (described afterward) 63, 64 provided on assembling jig 10, solenoid valve 65 of an air circuit for cylinder for rotation 46, and solenoid valve 66 of an air circuit for a pair of cylinder for engage and disengage 37 are connected.

At the initial setup, if the weights of above-described assembling jig 10 and radiator module 1 are detected by weight sensor 62 and are input to control unit 60, and thus the total weight is set as the support strength for supporting by arm member 54, within the predetermined range of the movement of arm member 54 of air balancer equipment 50, the total weight of assembling jig 10 and radiator module 1 will be supported and movable by pushing with hands.

Next, with referring FIG. 1 and FIGS. 9 to 13, explanation will be made for the method for assembling radiator module 1 to the front end part of the automobile body by using above-described air balancer equipment 50 and assembling jig 10 which is supported by the air balancer equipment 50 and is conveyed to the position of the automobile body.

Before starting assembly, the weights of assembling jig 10 and radiator module 1 supported thereby are detected by weight sensor 62 of air balancer equipment 50 and are memorized by control unit 60, and thus setup is made so that the total weight is hung and supported by arm member 54 of air balancer equipment 50.

In the first step, the lower part of hanging member 56 connected to the tip of arm member 54 of air balancer equipment 50 is bolted to jig base member 11 so that assembling jig 10 and radiator module 1 can be hung thereby. After that, as shown in FIG. 1, radiator module 1 is positioned to and held by hand body 16. On this occasion, hand body 16 is kept in almost vertical as its normal attitude. Holding plate 30 of hand body 16 is faced to the upper part of radiator module 1. Assembling jig 10 is moved downwardly from above toward radiator module 1. Thus, three positioning pins 34 provided on holding plate 30 are engaged to three positioning holes at the upper end of radiator module 1.

Then, the piston rod of cylinder for engage and disengage 37 of a pair of right and left positioning pin mechanisms 35 is extended, and a pair of right and left positioning pins 41 are engaged to a pair of positioning holes at the front end of radiator module 1. Next, in the second step, as shown in FIG. 1, assembling jig 10 and radiator module 1 hung by arm member 54 of above-described air balancer equipment 50 are moved to the vicinity of the front end of the automobile body by pushing with hands.

Figure 9:
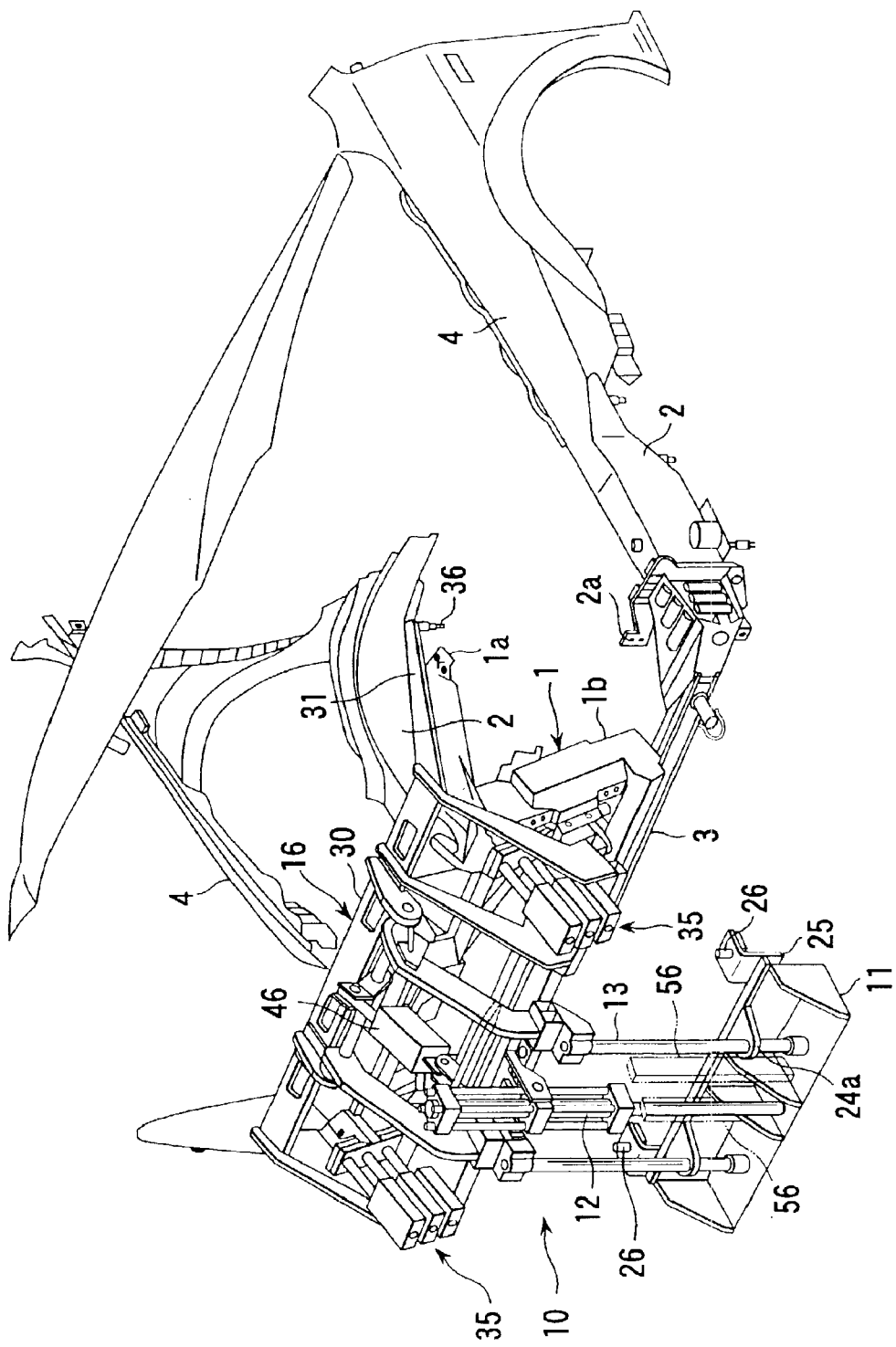
FIG. 9 is a perspective view showing the situation where the assembling jig and the radiator module are moved to the vicinity of the front end part of the automobile body.
Figure 10:
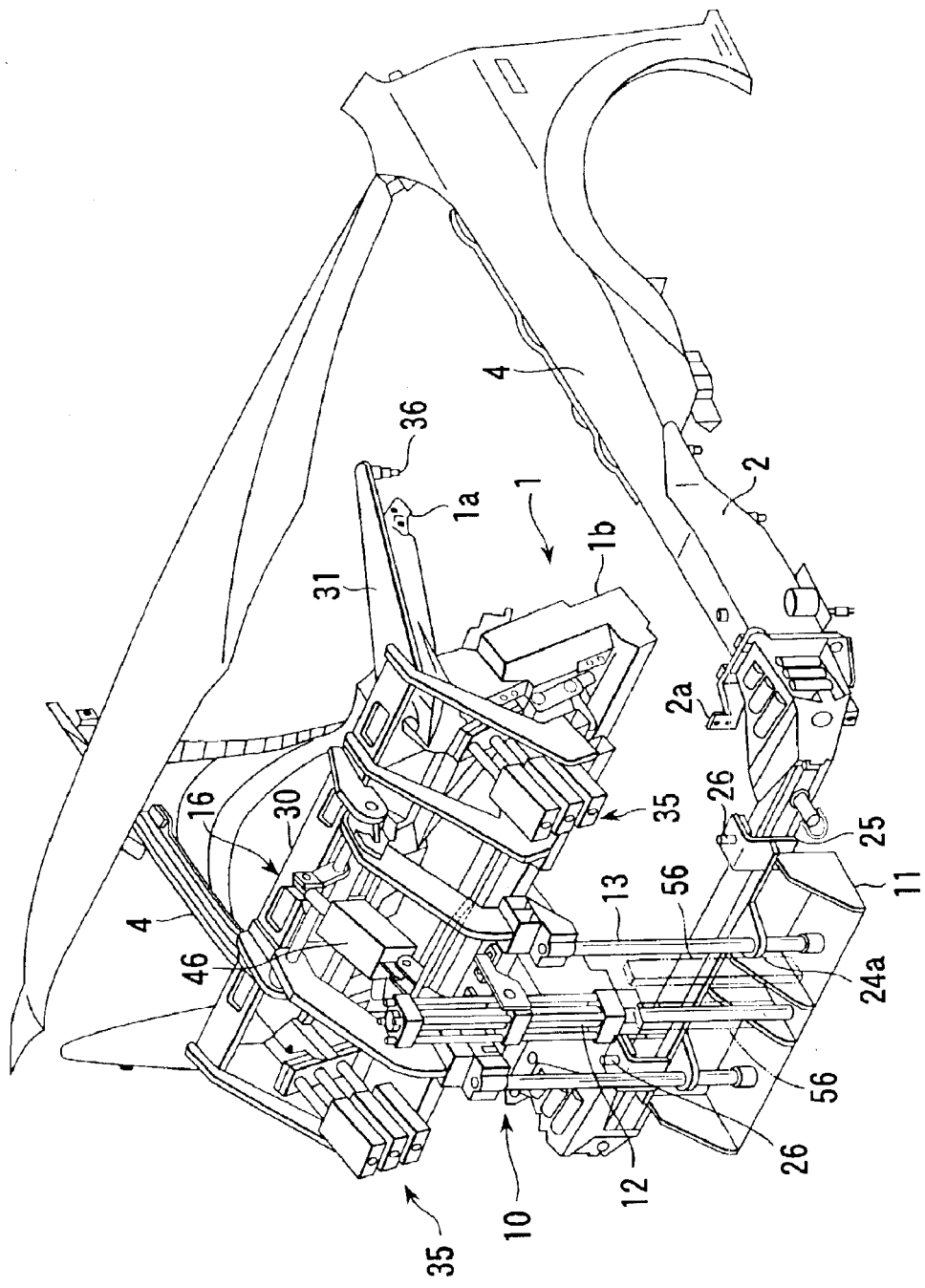
FIG. 10 is a perspective view showing the situation where the assembling jig and the radiator module are moved to the assembling position.
Figure 11:
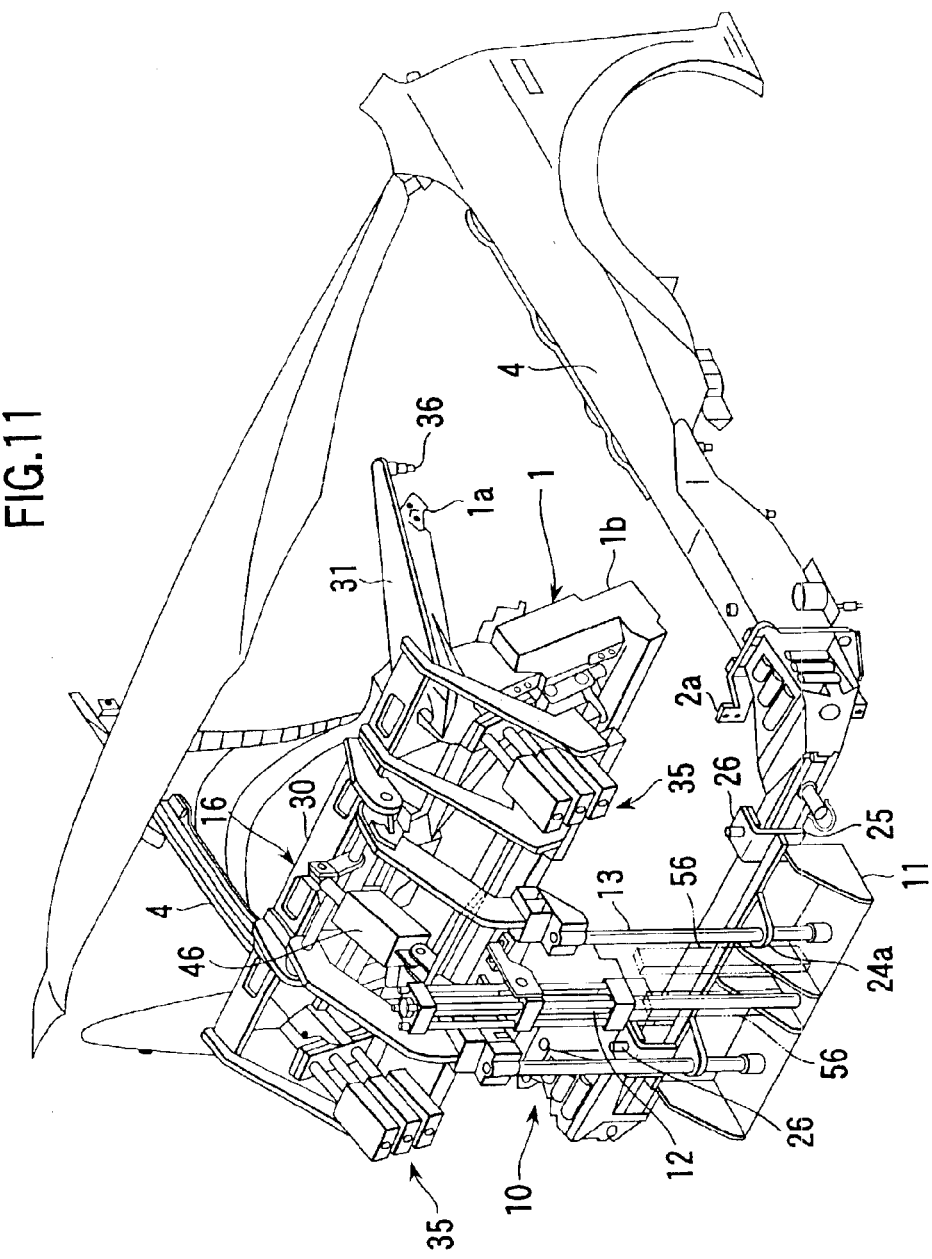
FIG. 11 is a perspective view showing the situation where the jig base of the assembling jig is positioned to the bumper reinforcement.

Then, in the third step, as shown in FIG. 9, by extending the piston rod of cylinder for elevation 12, elevating body 14, hand body 16 and radiator module 1 are set to the elevated position with respect to jig base member 11. In addition, by pulling back piston rod 46a of cylinder for rotation 46, hand body 16 and radiator module 1 are set to the forward-inclining attitude. Then, as shown in FIG. 10, arm member 54, assembling jig 10 and radiator module 1 are moved to the front end part of the automobile body. After a pair of positioning pins 26 of jig base member 11 are faced to a pair of positioning holes of bumper reinforcement 3 from above, as shown in FIG. 11, assembling jig 10 is moved downwardly, a pair of positioning pins 26 are engaged to a pair of positioning holes, and jig base member 11 is positioned to bumper reinforcement.

Figure 12:
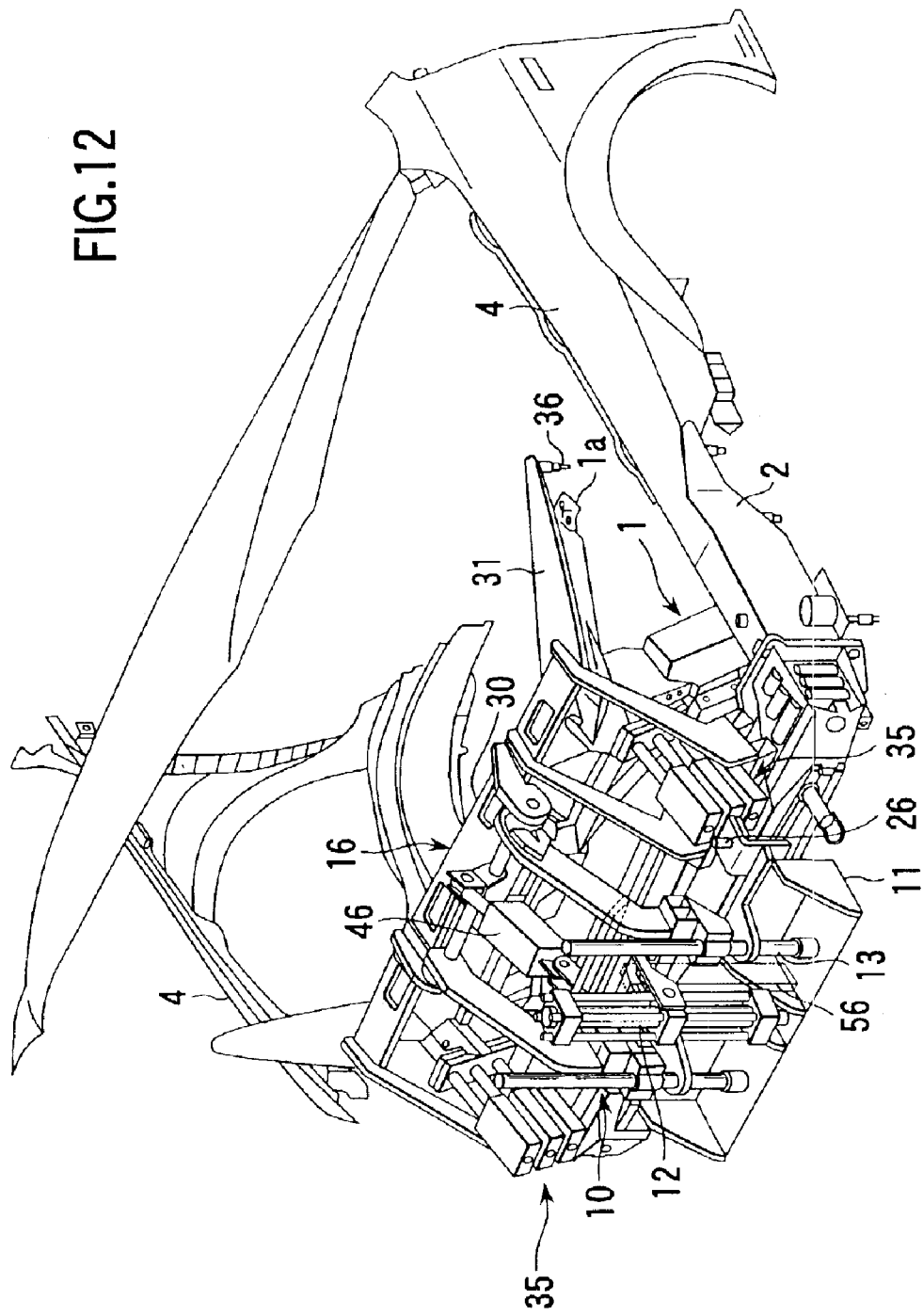
FIG. 12 is a perspective view showing the situation where the radiator module is moved to the temporary assembling position by the assembling jig.

Then, in the fourth step, as shown in FIG. 12, by pulling back the piston rod of cylinder for elevation 12, with keeping the forward-inclining attitude of hand body 16 and radiator module 1, elevating body 14, hand body 16 and radiator module 1 are moved downwardly with respect to jig base member 11 to a predetermined non-interference down position, which enables them to avoid interfering with the automobile body (bumper reinforcement 3), and which is detected by proximity switch 63. Next, by extending piston rod 46a of cylinder for rotation 46, hand body 16 and radiator module 1 are set to their normal attitude. The reason why radiator module 1 is moved downwardly with keeping its forward-inclining attitude is because the interference between the projecting part at the front side of radiator module 1 and bumper reinforcement 3 should be avoided.

Figure 13:
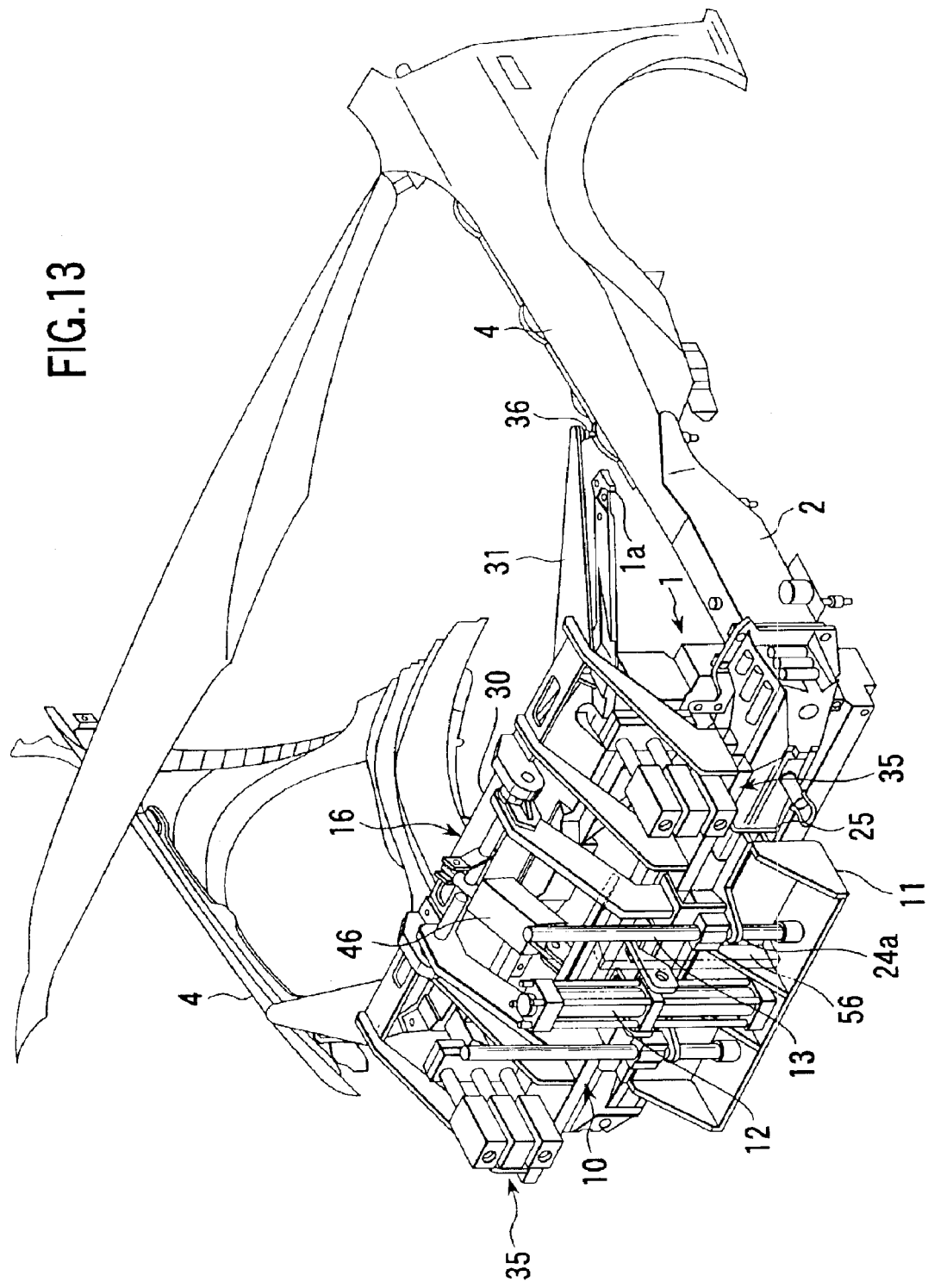
FIG. 13 is a perspective view showing the situation where the radiator module is assembled to the assembling position by the assembling jig.

Next, as shown in FIG. 13, hand body 16 and radiator module 1 are moved downwardly to a predetermined down end, which is detected by proximity switch 64. Positioning is made by engaging a pair of right and left positioning pins 36 at right and left projecting part 31 of hand body 16 to the positioning holes of right and left fender parts 4. At the same time, frame standard pin 20 provided on shelf member 32 is engaged to the positioning standard hole at front side frame of the right side. Thus, by three points consist of a pair of positioning pins 36 and frame standard pin 20, assembling jig 10 is positioned to the automobile body with high precision.

Next, in the fifth step, by controlling control panel 61, the supporting strength for supporting assembling jig 10 and radiator module 1 by arm member 54 of air balancer equipment 50 is reduced by a predetermined value (such as 5 kgw (=c.a. 0.51N)). As a result, plurality of parts to be connected 1a, 1b of radiator module 1 can intimately contact with plurality of parts for connection on the side of the automobile body. In this connection, the plurality of parts to be connected 1a, 1b are a pair of parts to be connected 1a at both right and left ends of shroud upper of radiator module 1 and a pair of parts to be connected 1b at both right and left ends of the front end of radiator shroud which is connected to bracket for fixing shroud (connecting part) 2a provided at the front ends of right and left front side frames 2.

Next, in the sixth step, plurality of the parts to be connected 1a, 1b of radiator module 1 is connected and fixed to bracket for fixing shroud 2a fixed to the connecting parts of right and left fender parts 4 and front side frame 4, respectively.

Next, in the seventh step, by pulling back the piston rod of cylinder for engage and disengage 37 of a pair of positioning pin mechanisms 35, a pair of positioning pins 41 are disengaged from radiator module 1. In addition, by extending the piston rod of cylinder for elevation 12 by a predetermined length, elevating body 14 and hand body 16 are elevated by around 5 cm, and by disengaging three positioning pins 34 from radiator module 1, hand body 16 is separated from radiator module 1.

Prior to the separation, by controlling control panel 61, the supporting strength for supporting assembling jig 10 by arm member 54 of air balancer equipment 50 is reduced by a weight of radiator module 1. Thus, when hand body 16 is separated from radiator module 1, assembling jig 10 together with arm member 54 are prevented from jumping upward without fault.

Next, in the eighth step, arm member 54 is manually moved to the original position of the conveyer, and the piston rod of cylinder for elevation 12 is pulled back and switched to the initial status, and thus they will be on stand by until next assembly of radiator module 1.

According to the above-described apparatus and method for assembling radiator module 1, the following results will be obtained. Since radiator module is assembled while bumper reinforcement 3 is assembled to connect the front ends of the right and the left front side frames 2 of the automobile body to each other so that the structure of the front part of the automobile body is fixed, the radiator module will be assembled efficiently with high precision. In the third step, since jig base member 11 is positioned to bumper reinforcement 3 by positioning pin 26, jig base member 11 will be positioned to the automobile body with high precision by using bumper reinforcement 3 effectively.

In the fourth step, since elevating body 14, hand body 16 and radiator module 1 are moved downwardly from the upper position with respect to jig base member 11, and a pair of the right and the left positioning pins 36 of hand body 16 are positioned to right and left fender parts of the automobile body 4, respectively, hand body 16 will be positioned to fender part 4 with high precision.

In the first step, since radiator module 1 is held by hand body 16 with high precision, by positioning hand body 16 precisely to fender part 4, radiator module 1 will be positioned precisely with respect to fender part 4 and front side frame 2.

In the fourth step, with avoiding the interference between radiator module 1 and the automobile body (bumper reinforcement 3), radiator module 1 will be positioned precisely to right and left fender parts 4. Owing to the pair of right and left positioning pins 36 of hand body 16 and frame standard pin 20, hand body 16 is positioned to the automobile body by the three different points, and thus hand body 16 will be positioned to the automobile body with high precision.

In the fifth step, a pair of parts to be connected 1a, 1b at both right and left ends of shroud upper of radiator module 1 are fixed to connecting parts of right and left fender parts 4 and to connecting bracket 2a at the vicinity of the front ends of front side frames 2, respectively. After that, in the seventh step, a pair of positioning pins 41 of a pair of positioning pin mechanisms 35 are disengaged from the positioning holes of radiator module 1, and three positioning pins 34 on holding plate 30 of hand body 16 are disengaged from the positioning holes of radiator module 1, so that hand body 16 is separated from radiator module 1.

In the fifth step, since the supporting strength for supporting assembling jig 10 and radiator module 1 by arm member 50 of air balancer equipment 50 is reduced, the positioning status of assembling jig 10 and radiator module 1 with respect to the automobile body will be stabilized, and each of the plurality of parts to be connected 1a, 1b of radiator module 1 will easily intimately contact with the parts for connection on the side of the automobile body.

Since assembling jig 10 and radiator module 1 are hung by air balancer equipment 50, if the supporting strength of arm member 54 was not adjusted, and thus the weight of radiator module 1 suddenly stopped acting on arm member 54 due to the release of the holding on hand body 16, arm member member 54 would abruptly jump. However, in the seventh step, by reducing the supporting strength for supporting assembling jig 10 by arm member 54 by the weight of radiator module 1, such abrupt jump of arm member 54 will be avoided. In this connection, since radiator module 1 contains a condenser for an air conditioner in addition to the radiator, the condenser for an air conditioner will be assembled together with the radiator as a module.

In the above-described assembling jig 10, by two pairs of positioning pins 34, 41 of hand body 16 and a pair of cylinders for engage and disengage which engage and disengage a pair of positioning pins 41, radiator module 1 will be efficiently positioned to and held by hand body 16 with high precision.

In addition, by way of positioning pin 26 of jig base member 11, jig base member 11 will be efficiently positioned to bumper reinforcement 3 with high precision. Further, hand body 16 is positioned precisely to the automobile body by a pair of positioning pins 36 of hand body 16 and frame standard pin 20, and thus in that situation, radiator module 1 will be efficiently assembled by way of assembling jig with high precision.

Here, explanation will be made for examples which alter the above-described embodiments partially.

1) Depending on the structure of radiator module 1, when radiator module 1 can be assembled to the automobile body by moving it downwardly from the upper position with keeping its vertical normal position, the mechanism for rotating hand body 16 can be omitted in assembling jig 10.

2) The above-described frame standard pin 20 can be constituted as a positioning pin of the type such that it is driven to be engaged or disengaged by an air cylinder.

3) The driving means for elevation, driving means for rotation and driving means for engage and disengage are not limited to the above-described driving cylinder type, but can be motor driven-type driven by a motor.

In this connection, it is possible to carry out the present invention in such an embodiment that above-described assembling jig is altered by adding thereto changes which are obvious for a person skilled in the art.

According to the first embodiment of the present invention, since the radiator module is assembled while the bumper reinforcement is assembled to connect the front ends of the right and the left front side frames of the automobile body to each other so that the structure of the front part of the automobile body is fixed, the radiator module will be assembled efficiently with high precision. In the third step, since the jig base member is positioned to the bumper reinforcement by way of the positioning member, the jig base member will be positioned to the automobile body with high precision by using the bumper reinforcement effectively.

In the fourth step, since the elevating body, hand body and radiator module are moved downwardly from the upper position with respect to jig base member, and a pair of the right and the left positioning members of the hand body are positioned to right and left fender parts of the automobile body, respectively, the hand body will be positioned to the fender part with high precision. Therefore, by holding the radiator module by the hand body with high precision, if the hand body is positioned precisely to fender part, the radiator module will be positioned precisely with respect to the fender part and the front side frame.

According to the second embodiment of the present invention, the hand body will be positioned precisely to the right and left fender parts with avoiding the interference between the radiator module and the automobile body.

According to the third embodiment of the present invention, due to the right and the left positioning members and a positioning standard member of the hand body, the hand body is positioned to the automobile body by the three different points, and thus is positioned to the automobile body with high precision.

According to the fourth embodiment of the present invention, each of the parts to be connected of the fender of the radiator module will be fixed to the parts for connection of right and left fender parts of the automobile body and to the part for connection at the vicinity of the front side frame, and then, the hand body will be separated from the radiator module by releasing the holding mechanism.

According to the fifth embodiment of the present invention, by reducing supporting strength for supporting the assembling jig and the radiator module by an arm member of the conveyor, the positioning status of the assembling jig and the radiator module with respect to the automobile body will be stabilized, and the plurality of the parts to be connected of the radiator module will intimately contact with each of the parts for connection easily.

When an air balancer equipment is employed as the conveyor, if the supporting strength of the arm member is not adjusted, and the weight of the radiator module suddenly stop acting on the arm member due to the release of the holding mechanism, the arm member can abruptly jump. According to the sixth embodiment of the present invention, such abrupt jump of the arm member will be avoided by reducing the supporting strength for supporting the assembling jig by an arm member by the weight of the radiator module.

According to the seventh embodiment of the present invention, since the radiator module contains a condenser for an air conditioner in addition to the radiator, the condenser for an air conditioner will be assembled together with the radiator as a module.

According to the eighth embodiment of the present invention, the apparatus for assembling a radiator module to the front end of an automobile body has such as a conveying means for carrying the assembly jig and the radiator module, the conveying means having an arm member; a jig base member which is connectable to the arm member; an elevating body which can be elevated on the jig base member by way of a guide rod, and driving means for elevating the elevating body; a hand body which is rotatable around an axis that is positioned in a widthwise direction of the automobile body on the elevating body, and driving means for rotating the hand body; a first positioning member which is provided on the hand body and is engagable to and disengagable from a positioning hole at the top end of the radiator module from above; a second positioning member which is provided on the hand body and is engagable to and disengagable from a positioning hole at the front end of the radiator module from front, and driving means for driving the second positioning member to engage and disengage the positioning hole; a third positioning member which is provided on the jig base member and is engagable to and disengagable from a positioning hole of a bumper reinforcement from above; and a fourth positioning member which is provided on the hand body and is engagable to and disengagable from a standard hole of a fender part from above, and a frame standard member which is engagable to and disengagable from a standard hole of a front side frame.

As a result, the radiator module will be assembled on the hand body with high precision by way of the first and the second positioning members of the and body and driving means for driving the second positioning member to engage and disengage. In addition, the jig base member will be precisely positioned to the bumper reinforcement by way of the third positioning member of the jig base member. Furthermore, the hand body will be positioned to the fender part and the front side frame with high precision by way of the fourth positioning member and the frame standard member. Thus, the radiator module will be positioned precisely and effectively with respect to the automobile body.

What is claimed is:

1. A method for mounting a radiator module containing a radiator and a radiator shroud in a vicinity of a back side of a bumper reinforcement and assembling the radiator module to an automobile body while the bumper reinforcement is assembled to connect front ends of right and left front side frames of the automobile body to each other, the method comprising the steps of:

providing an assembling jig having a jig base member, an elevating body capable of being elevated with respect to the jig base member, a hand body connected to the elevating body, and a holding mechanism for holding the radiator module when positioning the radiator module on the hand body;

connecting the jig base member to an arm member of an outside conveyor for carrying the assembly jig and the radiator module, and holding the radiator module on the hand body by way of the holding mechanism;

moving the assembling jig and the radiator module to a position for subsequent mounting to the automobile body;

positioning said jig base member next to the bumper reinforcement by way of a positioning member;

moving the elevating body, the hand body and the radiator module downwardly from an upper position with respect to said jig base member; and positioning a pair of right and left positioning members of the hand body to right and left fender parts of the automobile body, respectively.

2. The method for assembling a radiator module for an automobile according to claim 1, wherein said hand body of the assembling jig is connected to the elevating body rotatably around an axis that is positioned in a widthwise direction of the automobile body, and in the step for moving the elevating body, the hand body and the radiator, the hand body and the radiator module are moved downwardly to a predetermined non-interference down position with keeping their forward-inclining attitude, then the hand body and the radiator module are set to a position to be mounted on the automobile body, and they are moved downwardly to a predetermined down end and a pair of the right and the left positioning members of the hand body are positioned to the right and left fender parts of the automobile body, respectively.

3. The method for assembling a radiator module for an automobile according to claim 1, wherein in the step for positioning a pair of the right and the left positioning members of the hand body, a positioning standard member of the hand body is positioned to the right or left front side frame.

4. The method for assembling a radiator module for an automobile according to claim 1, wherein the method further comprises the steps of:

fixing a plurality of parts of the radiator module to be connected to parts for connection of the right and left fender parts of the automobile body and to a part for connection at the vicinity of the right and left front side frame, respectively; and separating the hand body from the radiator module by releasing said holding mechanism.

5. The method for assembling a radiator module for an automobile according to claim 4, wherein supporting strength for supporting the assembling jig and the radiator module by an arm member of the conveyor is reduced after the step for positioning a pair of the right and the left positioning members of the hand body and before the step for fixing a plurality of parts of the radiator module to be connected.

6. The method for assembling a radiator module for an automobile according to claim 4, wherein, in said step for separating the hand body from the radiator module, the supporting strength for supporting the assembling jig by an arm member of the conveyor is reduced by the weight of the radiator module at the time of the release of the holding mechanism.

7. The method for assembling a radiator module for an automobile according to claim 1, wherein said radiator module contains a condenser for an air conditioner in addition to the radiator.

* * * * *